Figure 1:
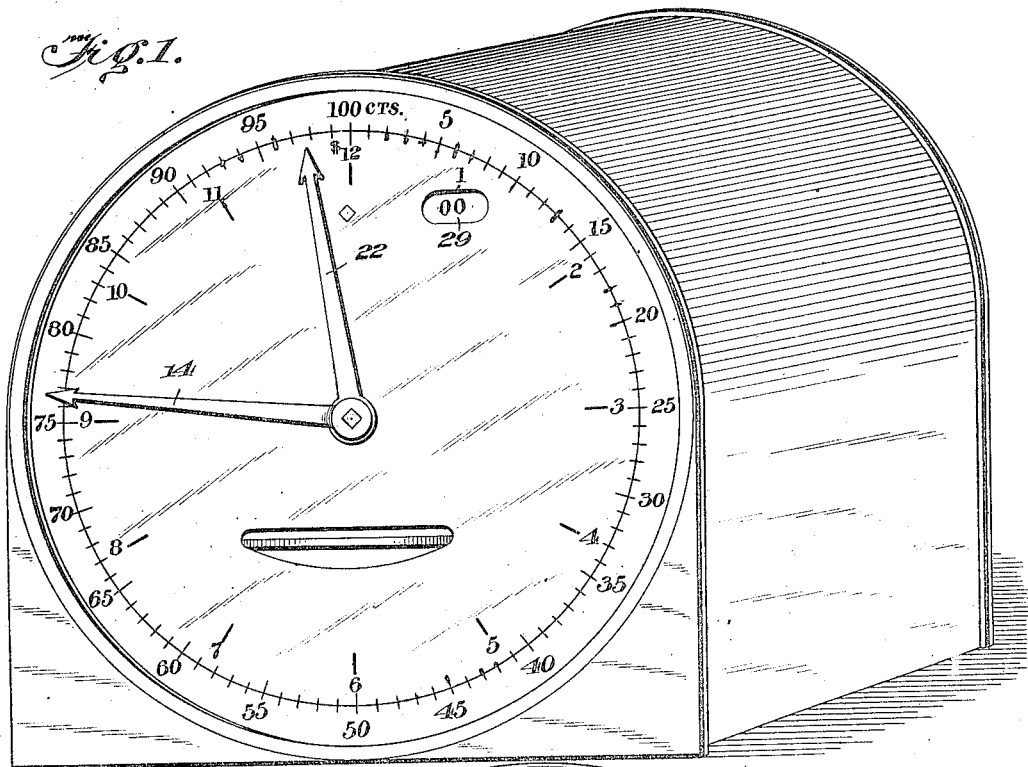

No. 875,238.

PATENTED DEC. 31, 1907.

W. E. BOYCE.
COMPUTING METER.
APPLICATION FILED OCT. 3, 1906.

2 SHEETS—SHEET 1.

Witnesses:

Inventor:
Warren E. Boyce
By Wm. C. Wilson
Attorney

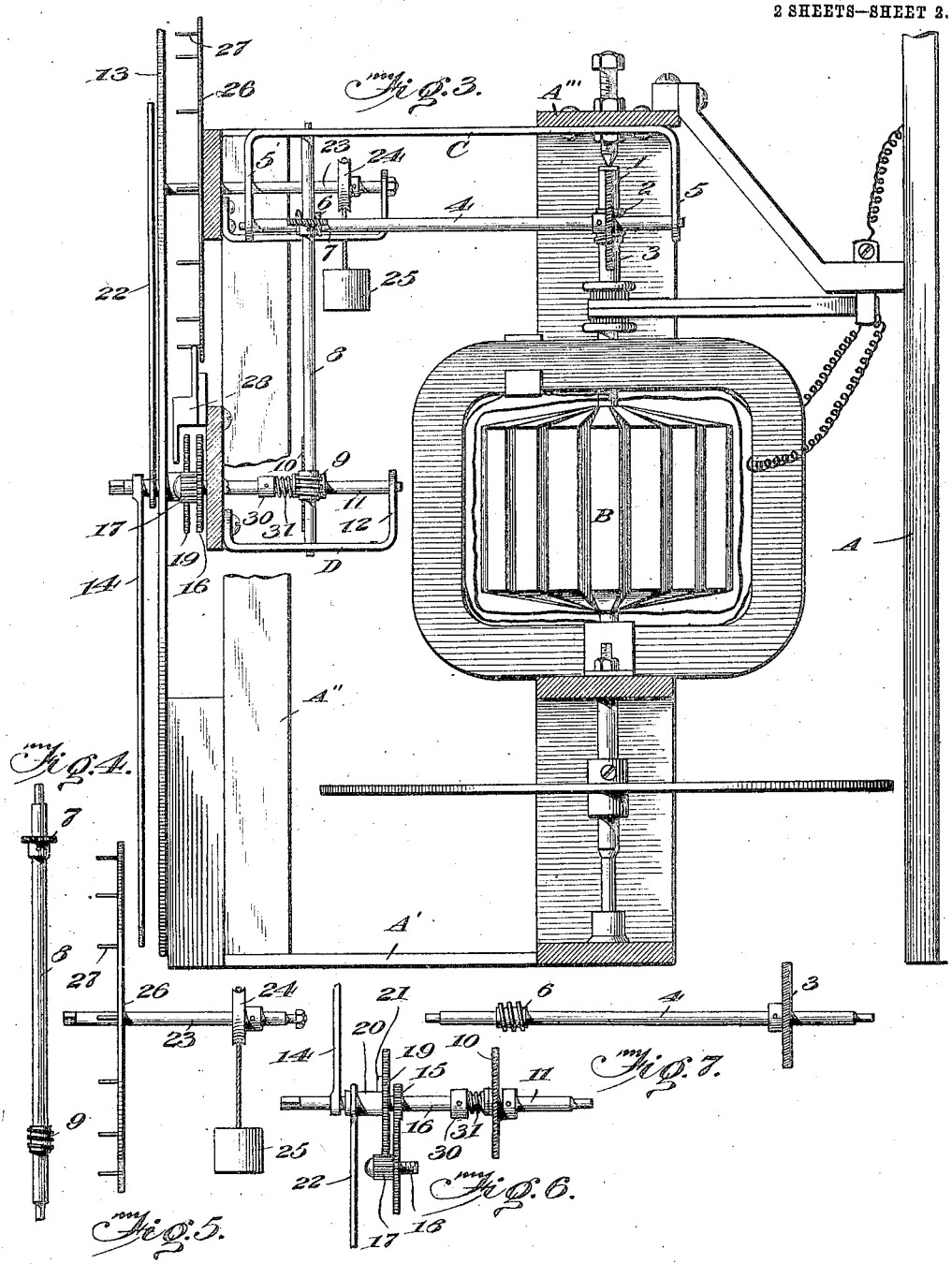

UNITED STATES PATENT OFFICE.

WARREN E. BOYCE, OF PIERCE CITY, MISSOURI, ASSIGNOR OF THREE-TWELFTHS TO WILLIAM F. GATEWOOD, OF PIERCE CITY, MISSOURI, AND FOUR-TWELFTHS TO ETHELBERT P. LAMPKIN, OF ST. LOUIS, MISSOURI.

COMPUTING-METER.

No. 875,238.

Specification of Letters Patent.

Patented Dec. 31, 1907.

Application filed October 3, 1906. Serial No. 337,230.

*To all whom it may concern:*

Be it known that I, WARREN E. BOYCE, a citizen of the United States, residing at Pierce City, in the county of Lawrence, State of Missouri, have invented certain new and useful Improvements in a Computing-Meter, of which the following is a full, clear, and exact description, reference being had to the accompanying drawings, forming a part hereof.

My invention relates to improvements in computing meters; and it consists in the novel construction of meter more fully set forth in the specification and pointed out in the claims.

In the drawings I show my invention designed particularly for an electric meter, but it will be understood from the description that it may be adapted for use on gas, water, or other meters.

Figure 2:
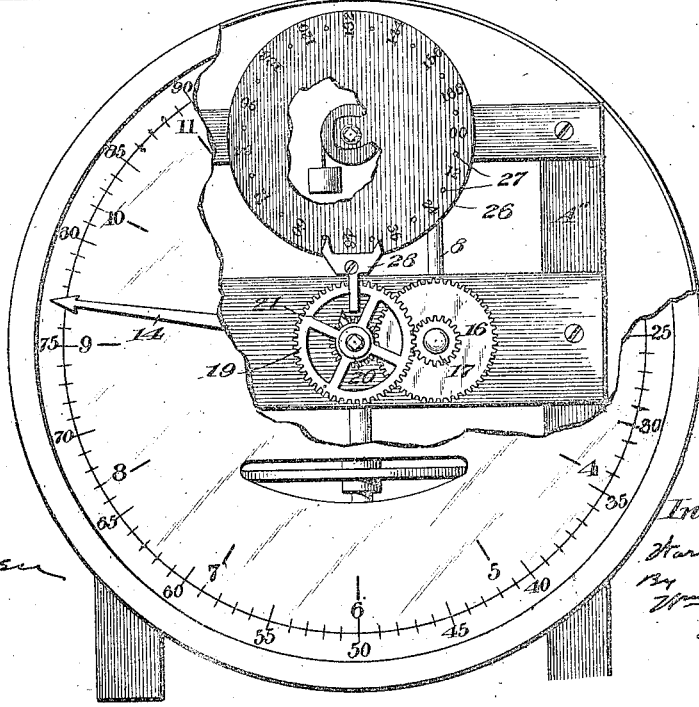

Figure 1 is a perspective of an electric meter; showing the dial for indicating the value of the current consumed in dollars and cents. Fig. 2 is a view with the case or covering removed; part of the outer dial broken away to show the inner dial and the escapement mechanism; Fig. 3 is a side view of the meter with the case removed; showing the meter-motor, and the arrangement of the working parts. Fig. 4 is a detail view of the small vertical shaft which engages the long horizontal shaft with the lower main dial shaft. Fig. 5 is a detail of the upper shaft carrying the inner dial, and showing the weight for operating the shaft. Fig. 6 is a detail, or top plan view of the gearing for revolving the pointer-hands about the face of the main dial. Fig. 7 is a detail of the long horizontal shaft which engages the motor shaft with the short vertical shaft.

The object of my invention is to construct a meter which will compute and indicate the value of the current consumed in dollars and cents, instead of the technical terms of "watts," "kilowatts" etc., which terms are not generally understood by the consumer. The meter will indicate at all times the total amount or value of the current consumed, and can be adjusted to any given price or rate for the current.

Referring to the drawings, A, A' A'', A''' represent parts of the meter frame, and B is the meter-motor fixed to a spindle to the upper part of which is fixed a worm-wheel 2 which engages a gear wheel 3 mounted upon a horizontal shaft 4 which has its bearings in the members 5, 5' of the hanger C which is secured to the frame A'''. The said shaft 4 is provided near its outer end with a worm-wheel 6 which engages a gear wheel 7 fixed to the vertical shaft 8 which has its bearing at the top in the hanger C and at the bottom in the bracket D; the said shaft 8 is provided with a worm-wheel 9 which engages a gear 10 fitted to the lower short horizontal shaft 11 having its bearing in the arm 12 of the bracket D; the said shaft 11 extends outward through the meter frame to a suitable distance beyond the outer dial 13 to carry the long pointer-hand 14 which registers from 1 ct. to 100 cts. upon each complete rotation of the hand about the dial.

Fixed, between the outer dial and the meter frame, upon the said shaft 11 is a small pinion 15 which engages a gear 16 carrying a pinion 17 journaled to a stud 18 secured to the meter frame, and, as shown in Fig. 6, the said pinion 17 engages a gear 19 carrying a sleeve 20 and lug 21 loosely mounted upon the shaft 11, and fixed to the sleeve 20 is the short pointer-hand 22 which registers from 100 cts. to $12 upon each complete revolution, or as the long pointer-hand is moved once about the dial the short pointer-hand is moved the space of one-twelfth registering $1.

The upper short horizontal shaft 23 is mounted in a bracket E secured to the frame of the meter, and is provided near its inner end with a sheave-wheel 24 over which is suspended upon a cord a suitable weight 25; and at the outer extremity of the said shaft 23 is secured a small auxiliary dial 26 which is provided on its face with the numeral multiples of twelve, from 00 to 180, as shown in Fig. 2, and spaced between each number is a small projecting pin 27; the said pins 27 alternately engage with an escapement 28 which regulates the movement of the small dial 26 as revolved by the weight 25. Upon each complete revolution of the short pointer-hand the escapement 28 is rocked by the lug 21 so that the small dial 26 is free to turn the space of one pin registering 12 on the inner dial which can be seen through the opening 29 in the outer dial, and on each succeeding movement of the inner dial the multiple of 12 is shown adding 12 to the registered amount. The sum shown on the inner dial plus the amount indicated on the outer dial gives the total reading of the meter. The inner dial is shown to register up to the amount of $180, but of course it may be changed or spaced to register a higher amount if desired. And to regulate the meter to any given price rate for the current the gear 7 on the shaft 8 may be changed to a larger or smaller size according to the rate for the current. To re-set the meter, I provide the gear 10 with a washer, and interposed between this washer and collar 30 is a coil spring 31 to frictionally hold the gear 10, so that a key may be placed upon the stem of the shaft 11 and the hands turned to set the meter without rotating the gear 10. Rotation to the indicating mechanism is in proportion to the speed of the meter-motor which tends to vary according to the current-flow through the consumption circuit in the meter, whereby current-flow is registered in the meter.

Having described my invention what I claim and desire to secure by Letters Patent is—

1. In an electric meter, the combination of an indicating mechanism actuated by a meter-motor, with an auxiliary dial mechanism operated by a suitable weight, and an escapement regulator controlling the auxiliary mechanism, substantially as shown and described.

2. In a computing meter, the combination with a meter frame, of a main dial indicating mechanism comprising a hanger C fixed to the meter frame; a horizontal shaft mounted in the said hanger; means for transmitting rotary motion from the meter shaft to the said horizontal shaft; a worm wheel on the said horizontal shaft to engage a gear wheel on a vertical shaft; the said gear wheel exchangeable and of a size regulated to the price rate for the current; the said vertical shaft and worm wheel thereon; the bracket D fixed to the meter frame; a lower short horizontal shaft and gear wheel thereon to engage with the worm on the vertical shaft; a long pointer hand and a pinion and loose gear and sleeve on the said lower horizontal shaft; a main recording dial, and a stud secured to the meter frame; a gear and pinion on said stud to respectively engage the pinion on the horizontal shaft and the gear on the loose sleeve; a lug on said sleeve, and a short pointer hand to record each complete revolution of the long pointer hand; an escapement adapted to be rocked by the said lug; and an auxiliary dial mechanism controlled by the said escapement, substantially as set forth.

3. In a computing meter, the combination with a meter frame, a main dial secured to the meter frame, a main recording mechanism, and an escapement regulator; the said escapement regulator adapted to control an auxiliary mechanism comprising an upper short horizontal shaft mounted in a bracket; the said bracket secured to the meter frame; a sheave wheel mounted on the said horizontal shaft; a suitable weight suspended from a cord leading over and around the said sheave and designed to give rotation to the said horizontal shaft which is provided on its outer extremity with an auxiliary dial in inner position to the main dial; the said dial provided on its outer face with the multiple numerals of the highest amount recorded by the main dial; pins spaced between the said numerals to engage the escapement regulator permitting the multiples to appear successively through the opening formed in the main dial indicating the computed value, which added to the amount registered by the main dial gives the total value of the current flow through the meter circuit, substantially as set forth.

In testimony whereof I affix my signature in the presence of two witnesses.

WARREN E. BOYCE.

Witnesses:
  THOS. CARLIN,
  G. W. SOLOMON.